Patented Aug. 28, 1945

2,383,558

UNITED STATES PATENT OFFICE 2,383,558

WOOD DIGESTION RESIN-ALDEHYDE CONDENSATION PRODUCT

Robert W. Martin, Savannah, Ga., assignor to Hercules Powder Company, Wilmington, Del., a corporation of Delaware No Drawing. Application December 5, 1941, Serial No. 421,775

14 Claims. (Cl. 260—25)

This invention relates to certain new condensation products, and in particular relates to new resinous products obtained by the condensation of aldehydes and the like with a wood digestion resin, and various modifications thereof.

In co-pending application, Serial No. 303,818, filed November 10, 1939, now Patent No. 2,265,181, there is described a new resinous material prepared by heating ligneous resinous wood, or a mixture of a ligneous substance and a resin acid material, in the presence of water at an elevated temperature and under super-atmospheric pressure. This resinous material, herein termed "wood digestion resin," is a hard, dark-colored substance, usually having a melting point above about 100° C. In some instances it may melt at temperatures as high as 250° C. In general, it is substantially insoluble in petroleum hydrocarbons, such as gasoline, but is readily soluble in acetone, ethanol, ethyl acetate, methanol, methyl isobutyl ketone, butyl acetate, and similar organic solvents. It is only partially soluble in aromatic hydrocarbons such as toluene and xylene. Other properties and characteristics of this resin are more fully pointed out hereinafter and in the above-mentioned application.

The present invention is based on the discovery that the above-described wood digestion resin reacts with aldehydes and like substances containing active methylene groups to form condensation products varying in character from soluble thermoplastic resins of relatively low softening point to insoluble thermosetting resins which approach infusibility. These resinous condensation products are adapted to use in the manufacture of laminating varnishes, impregnating and insulating compositions, etc.; as extending agents and fillers for other resins, such as the phenol-aldehyde and urea-aldehyde resins; as well as in the manufacture of molded articles and structural shapes, such as rods, sheets, blocks, etc.

It has also been found that mixed condensation products may be formed by carrying out the condensation of wood digestion resin and an aldehyde in the presence of other aldehyde-reactive substances, such as phenol or urea. Thus, for example, a mixture of wood digestion resin and phenol may be reacted with an aldehyde to form products having properties more or less intermediate between those of the phenol-aldehyde and resin-aldehyde condensation products. Mixed products may also be obtained by reacting wood digestion resin with a partially converted aldehyde condensate, such as an A-stage phenol-aldehyde resin. In general, such mixed products are applicable to the same general fields of use as the simple resin-aldehyde condensates, although certain of such mixed condensates will be found particularly well-adapted to certain specific uses by reason of their modified characteristics and properties.

The following examples will illustrate several ways in which the principle of the invention has been applied, but are not to be construed as limiting the same.

Example 1

A quantity of wood digestion resin was prepared by impregnating 150 parts by weight of spent pine wood chips, i. e., pine wood chips from which the turpentine and rosin had been extracted, with a solution of 50 parts by weight of B wood rosin in 400 parts by weight of acetone. The acetone was then removed by evaporation, and the impregnated chips were covered with 550 parts by weight of water in an autoclave. The autoclave was heated at a temperature of about 260–270° C. for 1 hour, during which time a pressure of about 950 pounds per square inch was developed. The autoclave was then cooled and vented to relieve the pressure, after which the resin product was removed and separated from the water. After heating to drive off gases, moisture, and other volatile products, the wood digestion resin was obtained as a hard, brittle, dark-colored resinous solid, having the following approximate analysis:

| | |
|---|---|
| Softening point °C | 138 |
| Acid No | 40 |
| Saponification No | 89 |
| Toluene insoluble per cent | 48 |
| Unsaponifiable do | 10 |
| Ash do | 1.3 |

Approximately 33 parts by weight of this resin was pulverized and mixed with 2 parts by weight of aqueous formaldehyde (37 per cent), 1 part by weight of aqueous ammonia (28 per cent), and 14 parts by weight of water. This mixture was slowly heated to a temperature of about 240° C. to drive off water, and was maintained at this temperature for about ½ hour, during which time the resin reacted with the formaldehyde to form a dark-colored molten mass. The condensation reaction was completed by raising the temperature to about 270° C., after which the product was cooled to about 250° C. and poured into molds. When completely cooled, the condensation product was a very dark resin having a smooth, hard, highly lustrous surface. It had a softening point of about 192° C.

*Example 2*

A mixture of 33 parts by weight of wood digestion resin, prepared as described in Example 1, 2 parts by weight of paraformaldehyde, 1 part by weight of aqueous ammonia (28 per cent), and 14 parts by weight of water was slowly heated to a temperature of about 240° C. and maintained at this temperature for about ½ hour. The temperature was then raised to about 270° C. and the molten product was poured into molds and allowed to cool. The condensation product so obtained was a hard, somewhat brittle resin having a softening point of about 179° C.

*Example 3*

A heat-curing molding powder was prepared by grinding together 20 parts by weight of pulverized wood digestion resin, 2 parts by weight of hexamethylenetetramine, and 1 part by weight of calcium hydroxide. A portion of the powder was then placed on a heated plate maintained at a temperature of about 200° C. and was mechanically worked until it set to form a hard resin. The setting time of this molding powder was thus determined to be about 55 seconds.

*Example 4*

A mixture of 130 parts by weight of Bakelite BR-13761 (an A-stage phenolic molding resin marketed by the Bakelite Corp.), 70 parts by weight of wood digestion resin, 0.7 part by weight of hexamethylenetetramine, 0.7 part by weight of trisodium phosphate, 4 parts by weight of magnesium stearate, and 200 parts by weight of wood flour was placed in a ball mill and milled for 6 hours. It was then milled on a two-roll mill at a temperature of 150° F. for about one minute, after which it was allowed to cool, and was ground to form a molding powder. Strong, tough moldings having a smooth lustrous surface were formed from this powder by molding at a pressure of 4,000 pounds per square inch and at a temperature of 300° F. for one minute.

*Example 5*

Approximately 872 parts by weight of a wood digestion resin prepared from equal parts of spent wood chips and B wood rosin in a manner similar to that described in Example 1, together with 9 parts by weight of aqueous formaldehyde and 1.5 parts by weight of aqueous ammonia were dissolved in a mixed solvent consisting of 523 parts by weight of ethanol and 11 parts by weight of toluene to form a heat-reactive laminating varnish. Equal parts by weight of this varnish and a solution of 500 parts by weight of Bakelite varnish BV-1112 (a commercial cresol-formaldehyde laminating varnish marketed by the Bakelite Corp.) in 125 parts by weight of ethanol-toluene (9:1) were mixed and employed to impregnate sheets of alpha cellulose paper. The impregnated sheets were then dried for 10 minutes at 257° F. to remove the solvent. Eight of the sheets were superimposed and subjected to 1500 pounds per square inch pressure at 300° F. for 15 minutes in a steam-heated platen press, after which the steam was shut off and cold water circulated through the press for fifteen minutes without releasing the pressure. There was thus obtained a strong, tough laminated board having a smooth, hard, water-resistant surface.

*Example 6*

Approximately 100 parts by weight of wood digestion resin, 8 parts by weight of furfural, 8 parts by weight of aniline, 2 parts by weight of water, and 0.5 part by weight of magnesium stearate were milled on a two-roll mill at a temperature of about 200° F. to secure complete admixture, after which the mixture was removed from the mill, allowed to cool, and ground in a Wiley mill to form a molding powder. This powder was then compression molded at a temperature of 300° F. under a pressure of 3,000 pounds per square inch for 3 minutes, whereby there was obtained a very hard dense molding having a smooth black lustrous finish.

*Example 7*

A mixture of 100 parts by weight of mixed cresols, 30 parts by weight of wood digestion resin, 100 parts by weight of aqueous ammonia was heated at reflux temperature for 4 hours, during which time a dark-colored liquid resin gradually precipitated out of the aqueous medium. The mixture was then heated under vacuum to a temperature of about 70° C. to drive off the water, whereby there was obtained a viscous dark-colored thermosetting liquid resin.

*Example 8*

A laminating varnish was prepared by dissolving 65 parts by weight of the mixed condensation product prepared in Example 7 in 35 parts by weight of a 9:1 ethanol-toluene mixture. Sheets of alpha cellulose paper were then impregnated with this varnish, and were thereafter dried to remove the solvent. A strong tough board was obtained by subjecting a stack of 15 of these sheets to a pressure of 1500 pounds per square inch at 325° F. for 20 minutes, followed by 20 minutes cooling with cold water at the same pressure.

*Example 9*

A mixture of 100 parts by weight of commercial phenol (88%), 28 parts by weight of wood digestion resin, 90 parts by weight of aqueous formaldehyde, and 0.1 part by weight of concentrated hydrochloric acid was heated at reflux temperature for one hour, and dehydrated as in Example 8. The partially converted resin product obtained was a tough, hard, dark-colored thermosetting resin.

*Example 10*

Approximately 86 parts by weight of the resin obtained in Example 9, 8.6 parts by weight of hexamethylenetetramine, 2 parts by weight of trisodium phosphate, 2 parts by weight of magnesium stearate, and 90 parts by weight of wood flour were ground together in a ball mill for 6 hours, after which the mixture was milled on a two-roll mill at 250° F. for one minute. The mixture was then ground to form a molding powder. At a temperature of 325° F. under a pressure of 400 pounds per square inch this powder cured in 30 seconds to form a hard dense resin.

As hereinbefore mentioned, the wood digestion resin which is reacted with an aldehyde or aldehyde-forming body to form the new condensation products is prepared according to the process described and claimed in co-pending application, Serial No. 303,818, filed November 10, 1939, now Patent No. 2,265,181. Such process consists essentially in heating a ligneous resinous cellulosic material, such as pine wood containing 15–25 per cent by weight of rosin, at an elevated temperature, e. g., between about 240° C. and about 330° C., and under super-atmospheric pressure while submerged in water until the fibrous structure of the material is destroyed and resinification takes place. Alternatively, a non-resinous ligneous material may be mixed or impregnated with a resin acid substance, e. g., crude rosin, and subjected to the same treatment. According to a preferred mode of operation, dead pine stump wood, or a mixture of crude rosin and spent pine wood chips from which the turpentine and rosin have been extracted, is placed in a stainless steel autoclave and covered with water. The autoclave is then heated to a temperature of about 240°–330° C., preferably 250°–280° C., for a period of time varying from about two minutes to about six hours, depending upon the particular kind of wood and the temperature employed. During the heating, the autogenous pressure within the autoclave may vary from 400 to 1900 pounds per square inch. The autoclave is then allowed to cool and is vented to release the pressure, after which the resin product is removed and separated from the water. Usually, the resin is then heated to a temperature of about 175–275° C. to expel dissolved gases, water, and volatile organic materials. Other methods of preparing resinous substances by the digestion of cellulosic materials in the presence of water may be employed, however, if desired.

The aldehyde with which the wood digestion resin is condensed to form the new products may be employed as such, e. g., aqueous formaldehyde, acetaldehyde, furfural, etc., or in the form of a substance which spontaneously forms reactive aldehydes under the conditions of the condensation reaction, e. g., hexamethylenetetramine and paraformaldehyde. The term "reactive aldehyde material" is herein employed to include both the aldehydes themselves and substances which form aldehydes during the reaction. Ordinarily it will be found preferable to employ liquid reactive aldehyde materials when preparing the new products directly in their ultimate form, as illustrated by Examples 1 and 2 above, whereas solid reactive aldehyde materials, such as paraformaldehyde and hexamethylenetetramine, are usually preferred in preparing molding powders in which the condensation reaction and shaping of the resulting product are simultaneously carried out in the molding press, as illustrated by Example 3. The reactive aldehyde material is usually employed in an amount representing between about 0.1 and about 10 per cent by weight of the wood digestion resin, although larger proportions may be required, particularly if another aldehyde-reactive substance, e. g., phenol, is present.

The reaction between reactive aldehyde materials and wood digestion resin is usually effected with the aid of catalysts or converting agents which may be either alkaline or acidic. Suitable alkaline catalysts include aqueous ammonia, lime, caustic soda, sodium carbonate, trisodium phosphate, potassium carbonate, borax, etc. Suitable acid catalysts include hydrochloric acid, sulfuric acid, phosphoric acid, sulfur dioxide, etc. Ordinarily such catalysts are employed in very small proportion, usually in amounts representing between about 0.05 and about 5 per cent by weight of the wood digestion resin plus any other aldehyde-reactive material which may be present.

As will be apparent from the foregoing examples, the reaction by which the new condensation products are formed may be carried out in a number of ways employing a wide variety of reaction conditions. In a general way, the reaction appears to take place in a manner similar to that of phenol-aldehyde condensation reactions, i. e., there is initially formed an A-stage resin which is relatively soluble and thermoplastic; further reaction gives rise to a B-stage resin which is somewhat less thermoplastic but is more or less insoluble; and finally there is formed a C-stage resin which is relatively insoluble and infusible. Thus, the reaction may be halted at intermediate points to obtain products of greater solubility and fusibility than the ultimate completely condensed products. Accordingly, the temperatures and time of reaction may be varied widely depending upon the type of product desired.

Ordinarily, in preparing the intermediate types of product, it is preferable to employ relatively moderate temperatures, e. g. 50°–120° C. so that the reaction takes place slowly and may readily be halted at the desired point. Such intermediate or partially converted product may then be mixed with other partially converted condensation products, e. g. A-stage phenolic resins, and the mixture thereafter heated to form a completely converted mixed condensate. Alternatively, the partially converted resin-aldehyde condensates may be dissolved in organic solvents, e. g. acetone, ethanol, benzene, toluene, methanol, etc., and employed as impregnating varnishes, which are subsequently cured by the application of heat and pressure. Such varnishes may, if desired, be employed in conjunction with other types of heat-curing varnishes and the like. The intermediate resin-aldehyde condensates may also be compounded with various addition agents, for example, inert fillers such as wood flour, asbestos fiber, cotton block, marble dust, etc.; mold lubricants such as calcium or magnesium stearate; etc., and employed as molding resins. The conditions under which such resins are molded depend upon the type of resin as well as the size and shape of the molding, but will usually comprise heating at temperatures between about 125° C. and about 200° C. under pressures between about 50 and about 5000 pounds per square inch for periods of time varying from several seconds to fifteen minutes.

In proceeding directly to the completely condensed products, somewhat higher temperatures, e. g. 150–300° C. may be employed to hasten the reaction. The products formed in this manner may be employed in finely-divided form as fillers in various plastic compositions, or they may be cut, sawed, or machined into various shapes.

Moldings comprising the resin-aldehyde condensation products may also be formed directly from molding powders. Such powders consist essentially of an intimate mixture of finely-divided wood digestion resin, a solid reactive aldehyde converting material, such as paraformaldehyde or hexamethylenetetramine, and a solid catalyst such as calcium hydroxide, trisodium phosphate, sodium carbonate, and the like. Various addition agents, such as fillers and mold lubricants, may be added if desired. Molding powders of this type may be employed according to any of the methods well-known in the art under conditions similar to those hereinbefore described. The partially converted resin-aldehyde condensates may also be employed in making molding powders.

Mixed condensates comprising the resin-aldehyde products may be formed by reacting wood digestion resin and a reactive aldehyde material in the presence of a partially converted aldehyde condensate, such as an A-stage phenolic resin, as hereinbefore explained, or by effecting both condensation reactions in a single step. In the latter case, a mixture of the wood digestion resin and the desired additional aldehyde-reactive substance, e. g., phenol, cresol, urea, aniline, etc., together with a reactive aldehyde material and a condensation catalyst are heated at temperatures between about 50° C. and 300° C. to effect condensation. This reaction may likewise be stopped at intermediate points to obtain products of varying degrees of conversion. In general, the mixed condensates are molded and otherwise employed in the same manner as the simple resin-aldehyde condensates.

It will be apparent from the foregoing that the new resinous condensation products provided by the invention are capable of wide use in the arts in the same general manner as the more expensive phenolic resins. As a whole they are characterized by good surface characteristics, high density, resistance to attack by acids, alkalies, and solvents, low moisture absorption, and good strength properties. While a number of modifications and uses of these products have been described in detail above, other variations and applications will be apparent to those skilled in the art upon employment of the invention in practice.

This application is a continuation-in-part of my co-pending application, Serial No. 303,818, filed November 10, 1939, now Patent No. 2,265,181.

What I claim and desire to protect by Letters Patent is:

1. The method of making a condensation product which comprises heating a wood digestion resin with an aldehyde in the presence of a condensation catalyst, said wood digestion resin being the resin product produced by heating a ligneous wood and a material selected from the group consisting of natural resin acids and materials containing natural resin acids, with water in amount sufficient to substantially completely submerged the wood under superatmosphere pressure at a temperature within the range of about 240° C. to about 330° C. until the cellular structure of the wood has disappeared and recovering said resin as the residue remaining after removal of the water solution.

2. The method of making a condensation product which comprises heating a wood digestion resin with between about 0.1 and about 10 per cent by weight of aqueous formaldehyde in the presence of a catalyst amount of an inorganic alkaline material, said wood digestion resin being the resin product produced by heating a ligneous wood and a material selected from the group consisting of natural resin acids and materials containing natural resin acids, with water in amount sufficient to substantially completely submerge the wood under superatmospheric pressure at a temperature within the range of about 240° C. to about 330° C. until the cellular structure of the wood has disappeared and recovering said resin as the residue remaining after removal of the water solution.

3. A condensation product of a wood digestion resin and a substance selected from the group consisting of aldehydes and compounds which form aldehydes when heated, said wood digestion resin being the resin product produced by heating a ligneous wood and a material selected from the group consisting of natural resin acids and materials containing natural resin acids, with water in amount sufficient to substantially completely submerged the wood under superatmosperic pressure at a temperature within the range of about 240° C. to about 330° C. until the cellular structure of the wood has disappeared and recovering said resin as the residue remaining after removal of the water solution.

4. A condensation product of a wood digestion resin and an aldehyde, said wood digestion resin being the resin product produced by heating a ligneous wood and a material selected from the group consisting of natural resin acids and materials containing natural resin acids, with water in amount sufficient to substantially completely submerge the wood under superatmospheric pressure at a temperature within the range of about 240° C. to about 330° C. until the cellular structure of the wood has disappeared and recovering said resin as the residue remaining after removal of the water solution.

5. A condensation product of a wood digestion resin and formaldehyde, said wood digestion resin being the resin product produced by heating a ligneous wood and a material selected from the group consisting of natural resin acids and materials containing natural resin acids, with water in amount sufficient to substantially completely submerge the wood under superatmospheric pressure at a temperature within the range of about 240° C. to about 330° C. until the cellular structure of the wood has disappeared and recovering said resin as the residue remaining after removal of the water solution.

6. A condensation product of a wood digestion resin and furfural, said wood digestion resin being the resin product produced by heating a ligneous wood and a material selected from the group consisting of natural resin acids and materials containing natural resin acids, with water in amount sufficient to substantially completely submerge the wood under superatmospheric pressure at a temperature within the range of about 240° C. to about 330° C. until the cellular structure of the wood has disappeared and recovering said resin as the residue remaining after removal of the water solution.

7. A condensation product of a wood digestion resin and hexamethylenetetramine, said wood digestion resin being the resin product produced by heating a ligneous wood and a material selected from the group consisting of natural resin acids and materials containing natural resin acids, with water in amount sufficient to substantially completely submerged the wood under superatmospheric pressure at a temperature within the range of about 240° C. to about 330° C. until the cellular structure of the wood has disappeared and recovering said resin as the residue remaining after removal of the water solution.

8. A condensation product of a wood digestion resin, formaldehyde, and a phenol, said wood digestion resin being the resin product produced by heating a ligneous wood and a material selected from the group consisting of natural resin acids and materials containing natural resin acids, with water in amount sufficient to substantially completely submerge the wood under superatmospheric pressure at a temperature within the range of about 240° C. to about 330° C. until the cellular structure of the wood has disappeared and recovering said resin as the residue remaining after removal of the water solution.

9. The method of making a condensation product which comprises heating a mixture comprising a wood digestion resin and a substance selected from the group consisting of aldehydes and compounds which form aldehydes when heated, said wood digestion resin being produced by heating a ligneous wood and a material selected from the group consisting of natural resin acids and materials containing natural resin acids, with water in amount sufficient to substantially completely submerge the wood under superatmospheric pressure at a temperature within the range of about 240° C. to about 330° C. until the cellular structure of wood has disappeared and recovering said resin as the residue remaining after removal of the water solution.

10. The method of making a condensation product which comprises heating a mixture comprising a wood digestion resin and a substance selected from the group consisting of aldehydes and compounds which form aldehydes when heated in the presence of a condensation catalyst, said wood digestion resin being produced by heating a ligneous wood and a material selected from the group consisting of natural resin acids and materials containing natural resin acids, with water in amount sufficient to substantially completely submerge the wood under superatmospheric pressure at a temperature within the range of about 240° C. to about 330° C. until the cellular structure of the wood has disappeared and recovering said resin as the residue remaining after removal of the water solution.

11. The method of making a condensation product which comprises heating a mixture comprising a wood digestion resin, a substance selected from the group consisting of aldehydes and compounds which form aldehydes when heated, and phenol, said wood digestion resin being produced by heating a ligneous wood and a material selected from the group consisting of natural resin acids and materials containing natural resin acids, with water in amount sufficient to substantially completely submerge the wood under superatmospheric pressure at a temperature within the range of about 240° C. to about 330° C. until the cellular structure of the wood has disappeared and recovering said resin as the residue remaining after removal of the water solution.

12. The method of making a condensation product which comprises heating a mixture of a wood digestion resin and a heat-convertible phenolaldehyde condensate with formaldehyde, said wood digestion resin being produced by heating a ligneous wood and a material selected from the group consisting of natural resin acids and materials containing natural resin acids, with water in amount sufficient to substantially completely submerge the wood under superatmospheric pressure at a temperature within the range of about 240° C. to about 330° C. until the cellular structure of the wood has disappeared and recovering said resin as the residue remaining after removal of the water solution.

13. A molding powder comprising an intimate mixture of a finely-divided wood digestion resin and a finely-divided solid compound which forms an aldehyde when heated, said wood digestion resin being the resin product produced by heating a ligneous wood and a material selected from the group consisting of natural resin acids and materials containing natural resin acids, with water in amount sufficient to substantially completely submerge the wood under atmospheric pressure at a temperature within the range of about 240° C. to about 330° C. until the cellular structure of the wood has disappeared and recovering said resin as the residue remaining after removal of the water solution.

14. A molding powder comprising an intimate mixture of a finely-divided wood digestion resin, a finely-divided solid compound which forms an aldehyde when heated and a finely-divided solid alkaline condensation catalyst, said wood digestion resin being the resin product produced by heating a ligneous wood and a material selected from the group consisting of natural resin acids and materials containing natural resin acids, with water in amount sufficient to substantially completely submerge the wood under superatmospheric pressure at a temperature within the range of about 240° C. to about 330° C. until the cellular structure of the wood has disappeared and recovering said resin as the residue remaining after removal of the water solution.

ROBERT W. MARTIN.